(12) United States Patent
Dalton et al.

(10) Patent No.: US 12,441,133 B2
(45) Date of Patent: Oct. 14, 2025

(54) SCORECARD ASSEMBLY

(71) Applicant: Textron Inc., Providence, RI (US)

(72) Inventors: Michael O'Brien Dalton, Evans, GA (US); Kelsey Marie Dobson, Augusta, GA (US); Richard Franklin Krall, North Augusta, SC (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 18/485,697

(22) Filed: Oct. 12, 2023

(65) Prior Publication Data

US 2025/0121624 A1 Apr. 17, 2025

(51) Int. Cl.
  *B42F 9/00* (2006.01)
  *B60R 11/00* (2006.01)

(52) U.S. Cl.
  CPC .............. *B42F 9/002* (2013.01); *B60R 11/00* (2013.01); *B60R 2011/001* (2013.01)

(58) Field of Classification Search
  CPC . B42F 9/002; B42F 9/00; B60R 11/00; B60R 2011/001
  USPC ...... 224/276; 281/5, 7, 9, 10, 45, 48, 49, 51
  See application file for complete search history.

(56) References Cited

U.S. PATENT DOCUMENTS

| | | | |
|---|---|---|---|
| 4,106,678 A | 8/1978 | Thomas | |
| 4,449,310 A | 5/1984 | Kline | |
| 4,620,682 A | 11/1986 | Yim | |
| 4,832,362 A | 5/1989 | Chen | |
| 4,875,579 A | 10/1989 | Tak | |
| 4,886,196 A | 12/1989 | Plummer | |
| 5,050,830 A | 9/1991 | Hall | |
| 5,180,133 A * | 1/1993 | Chang | B43L 5/02 248/176.1 |
| 5,312,082 A * | 5/1994 | Chang | B42F 9/001 248/452 |
| 5,339,951 A | 8/1994 | Chen | |
| 5,387,010 A | 2/1995 | Mohr | |
| 5,511,660 A | 4/1996 | Yamada et al. | |
| 5,788,071 A | 8/1998 | Shiao | |
| 5,848,742 A | 12/1998 | Wang | |
| 6,041,986 A | 3/2000 | Wu | |
| 6,102,263 A | 8/2000 | Rosato | |
| 6,131,733 A | 10/2000 | Ergle et al. | |

(Continued)

FOREIGN PATENT DOCUMENTS

| | | |
|---|---|---|
| AU | 2011201192 A1 | 10/2012 |
| CN | 207950524 U | 10/2018 |

(Continued)

*Primary Examiner* — Justin V Lewis
(74) *Attorney, Agent, or Firm* — Sandberg Phoenix & von Gontard, P.C.

(57) ABSTRACT

A golf car scorecard holder assembly, wherein the assembly includes a baseplate having a topside face, an underside face and a clip attachment portion. The assembly additionally includes a retention clip pivotally connectable to the clip attachment portion of the baseplate such that a pivot axis of the retention clip relative to the baseplate is adjacent the underside face of the baseplate. The assembly further includes a biasing device disposed between a backside of the retention clip and the topside face of the baseplate, the biasing device structured and operable to exert a closing force on the retention clip to bias the retention clip to a Closed position.

16 Claims, 8 Drawing Sheets

(56) References Cited

U.S. PATENT DOCUMENTS

| | | |
|---|---|---|
| 6,341,752 B1 | 1/2002 | Green |
| 6,364,127 B1 | 4/2002 | Richardson |
| 6,382,572 B1 | 5/2002 | Lin |
| 6,428,422 B1 | 8/2002 | Bennett |
| 6,523,290 B1 | 2/2003 | Hanna et al. |
| 6,669,065 B1 | 12/2003 | Bradley et al. |
| 6,988,646 B2 | 1/2006 | White |
| 8,087,711 B1 | 1/2012 | Mauro |
| 8,381,954 B2 | 2/2013 | Liao |
| 10,099,098 B2 | 10/2018 | Snyder et al. |
| 10,166,446 B2 | 1/2019 | Whittington |
| 11,123,617 B2 | 9/2021 | Fulford |
| 2006/0054759 A1* | 3/2006 | Pollman ............ A63B 71/0672 248/231.61 |
| 2008/0214328 A1 | 9/2008 | Lee |
| 2009/0106946 A1 | 4/2009 | Brewer |
| 2011/0215013 A1 | 9/2011 | Young et al. |
| 2012/0132556 A1 | 5/2012 | Webster |
| 2014/0329619 A1 | 11/2014 | Chang |
| 2022/0249927 A1 | 8/2022 | Jeoung |

FOREIGN PATENT DOCUMENTS

| | | |
|---|---|---|
| CN | 208663019 U | 3/2019 |
| EP | 1762279 A1 | 3/2007 |
| EP | 1970103 A1 | 9/2008 |
| GB | 2403259 A | 12/2004 |
| JP | 6004380 B2 | 10/2016 |
| KR | 86000208 Y1 | 9/1986 |
| KR | 970002312 Y1 | 3/1997 |
| KR | 200319956 Y1 | 7/2003 |
| KR | 100653918 B1 | 12/2006 |
| KR | 100653919 B1 | 12/2006 |
| KR | 200488123 Y1 | 12/2018 |
| KR | 20210069798 A | 6/2021 |
| KR | 20210002790 U | 12/2021 |
| WO | 2005115564 A1 | 12/2005 |
| WO | 2007032578 A1 | 3/2007 |

\* cited by examiner

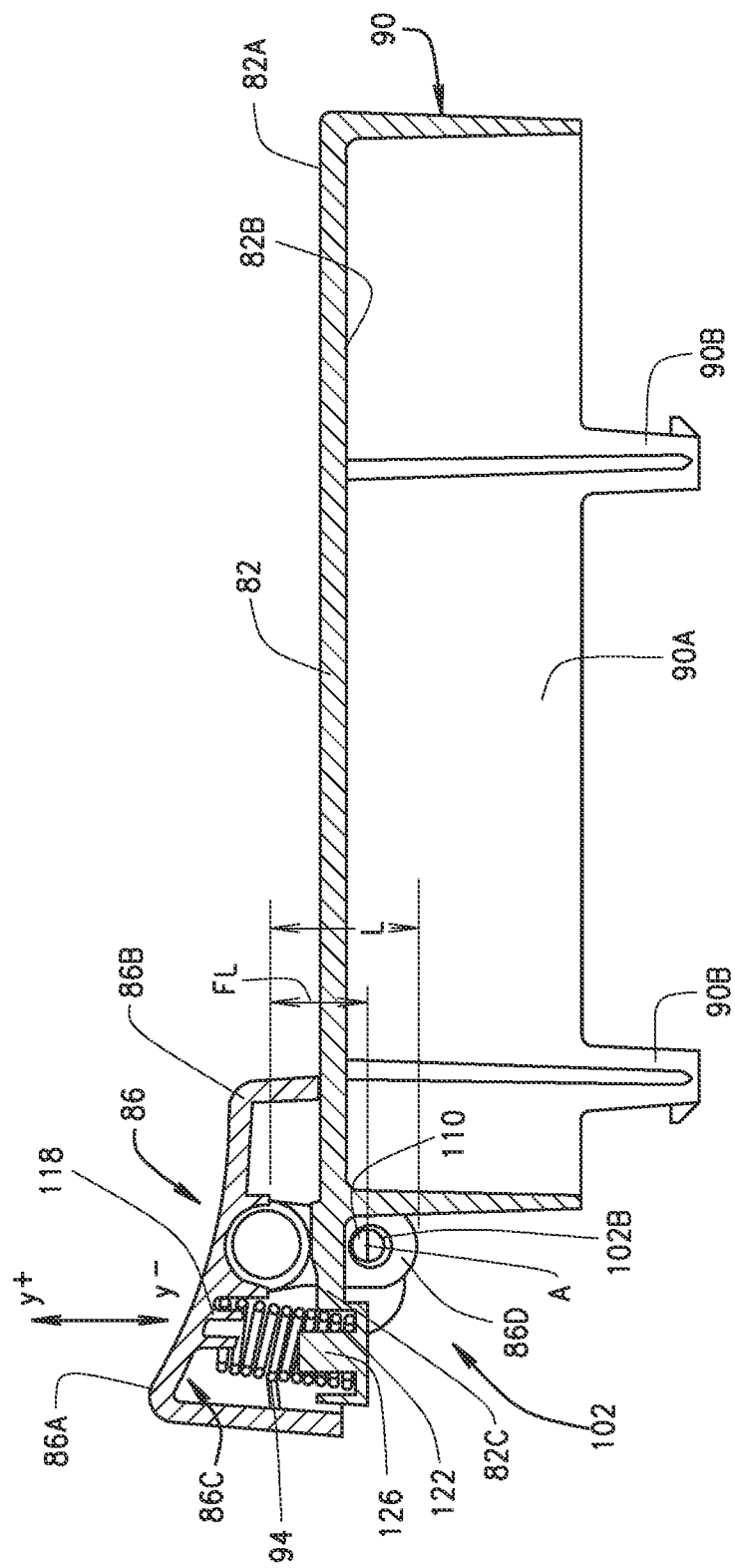

SCORECARD ASSEMBLY

FIELD

The present teachings relate to golf cars and more particularly to scorecard holder assemblies for golf cars.

BACKGROUND

The statements in this section merely provide background information related to the present disclosure and may not constitute prior art.

Traditionally, a golf car scorecard holder assembly includes a clip pivotally connected to a baseplate, whereby the clip is manually operated between a Closed and an Opened position to place a scorecard under the clip. The clip is typically biased to the Closed position such that a biasing force holds and retains the scorecard under the clip, i.e., between the clip and the baseplate. Known scorecard assemblies are typically structured such that the clip is retained on the plate using two posts and two screws to secure the clip to the baseplate, and two springs disposed between the two posts to provide the closing biasing force. Furthermore, known scorecard assemblies are typically structured such that a pivot axis of the clip located above and adjacent a top surface or face of the baseplate. The top surface or face of the baseplate being the surface or face that faces away from the floorboard of golf car and upward toward a canopy of the golf car, or upward toward the face of a driver of the golf car. For example, in many instances, the clip pivot axis is located at a point where rounded sidewalls of the clip contact the top surface of face of the baseplate. This configuration of parts makes the assembly of known scorecard holder assemblies complex and difficult to operate, and the number of parts makes the assembly expensive. Additionally, in many instances, the pivot axis being above and adjacent the top surface or face of the baseplate limits the clamping force of the clip such that the clip does not provide sufficient clamp load on the scorecard, whereby the scorecard can easily fall out or easily be knocked out. Furthermore, in many known instances where the pivot axis is above and adjacent the top surface or face of the baseplate, the clip difficult to actuate so it is cumbersome to open the clip to insert the scorecard.

SUMMARY

In various embodiments, the present disclosure provides a golf car scorecard holder assembly, wherein the assembly comprises a baseplate having a topside face, an underside face and a clip attachment portion; a retention clip pivotally connectable to the clip attachment portion of the baseplate such that a pivot axis of the retention clip relative to the baseplate is adjacent the underside face of the baseplate; and a biasing device disposed between a backside of the retention clip and the topside face of the baseplate, wherein the biasing device is structured and operable to exert a closing force on the retention clip to bias the retention clip to a closed position.

In various other embodiments, the present disclosure provides a golf car comprising a steering wheel, wherein the steering wheel comprises a scorecard holder assembly. In various embodiments, the scorecard holder assembly comprises a baseplate having a topside face, an underside face and a clip attachment portion; a retention clip pivotally connectable to the clip attachment portion of the baseplate such that a pivot axis of the retention clip relative to the baseplate is adjacent the underside face of the baseplate; and a biasing device disposed between a backside of the retention clip and the topside face of the baseplate, wherein the biasing device is structured and operable to exert a closing force on the retention clip to bias the retention clip to a Closed position.

In yet other embodiments, the present disclosure provides a golf car scorecard holder assembly, wherein the golf car scorecard holder assembly comprises a baseplate comprising a topside face, an underside face and a clip attachment portion; a retention clip comprising a head section and a foot section. The retention clip is pivotally connectable to the clip attachment portion of the baseplate such that a pivot axis of the retention clip relative to the baseplate is adjacent the underside face of the baseplate. The golf car scorecard holder assembly additionally comprises a compression spring disposed between a backside of the retention clip and the topside face of the baseplate, the compression spring structured and operable to exert a closing force on the retention clip to bias the retention clip to a Closed position. The golf car scorecard holder assembly further comprises a spring alignment post structured and operable to align and retain a first distal end of compression spring, and a spring receiving reservoir structured and operable receive and retain a second distal end of the compression spring.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

FIG. 8 is an exemplary cross-sectional side view of the scorecard holder assembly shown in FIGS. 1 through 7, wherein the retention clip of the scorecard holder assembly is shown in a Closed position, in accordance with various embodiments of the present disclosure.

Corresponding reference numerals indicate corresponding parts throughout the several views of drawings.

DETAILED DESCRIPTION

Figure 1:
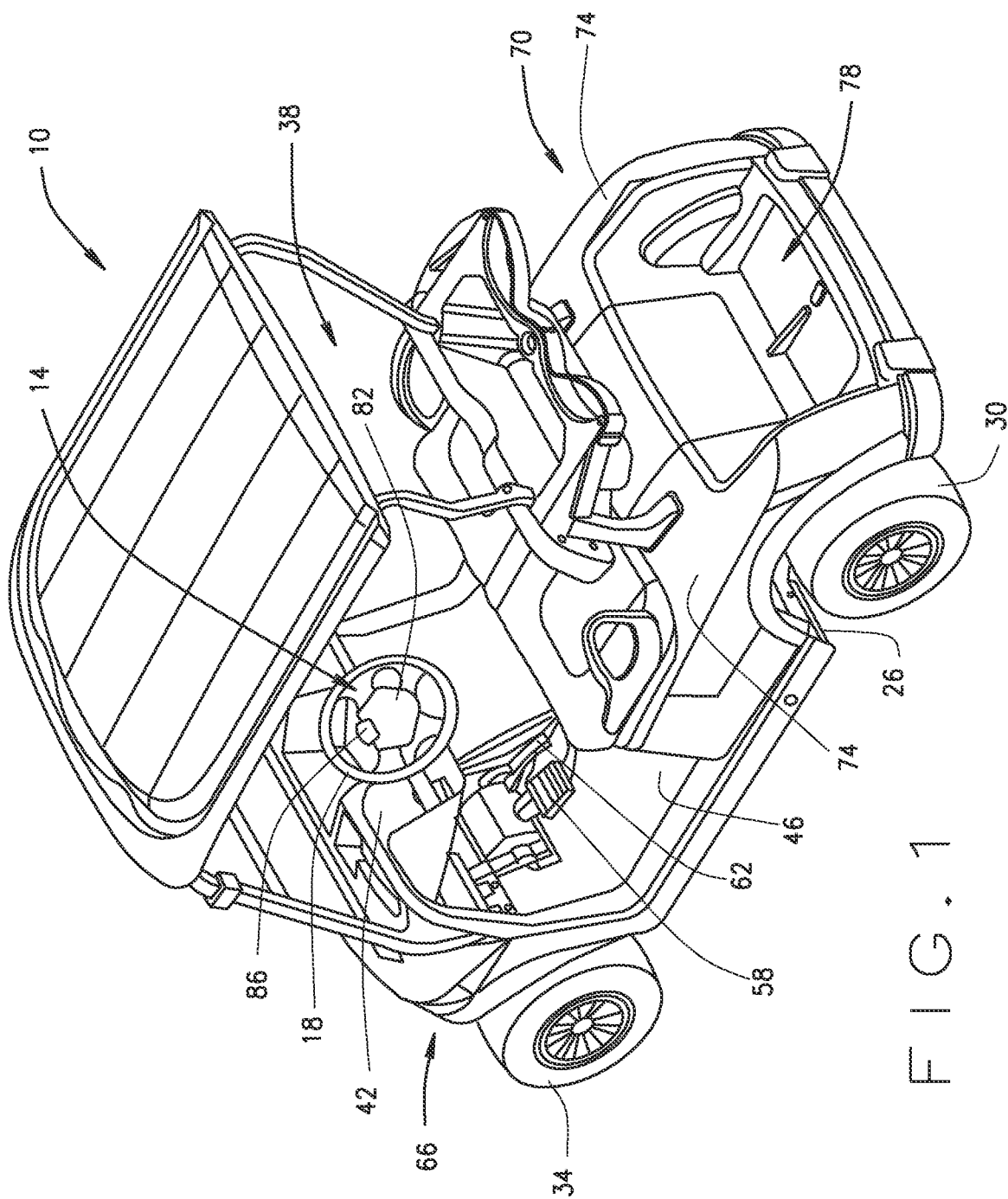
FIG. 1 is an exemplary isometric view of a golf car comprising a scorecard holder assembly, in accordance with various embodiments of the present disclosure.

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises", "comprising", "including", and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on", "engaged to or with", "connected to or with", or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on", "directly engaged to", "directly connected to", or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between", "adjacent" versus "directly adjacent", etc.).

As used herein the phrase "operably connected to" will be understood to mean two are more elements, objects, devices, apparatuses, components, etc., that are directly or indirectly connected to each other in an operational and/or cooperative manner such that operation or function of at least one of the elements, objects, devices, apparatuses, components, etc., imparts or causes operation or function of at least one other of the elements, objects, devices, apparatuses, components, etc. Such imparting or causing of operation or function can be unilateral or bilateral.

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) taught herein, and because many modifications may be made in the embodiments described herein, it is to be understood that the details herein are to be interpreted as illustrative and non-limiting.

Figure 2:
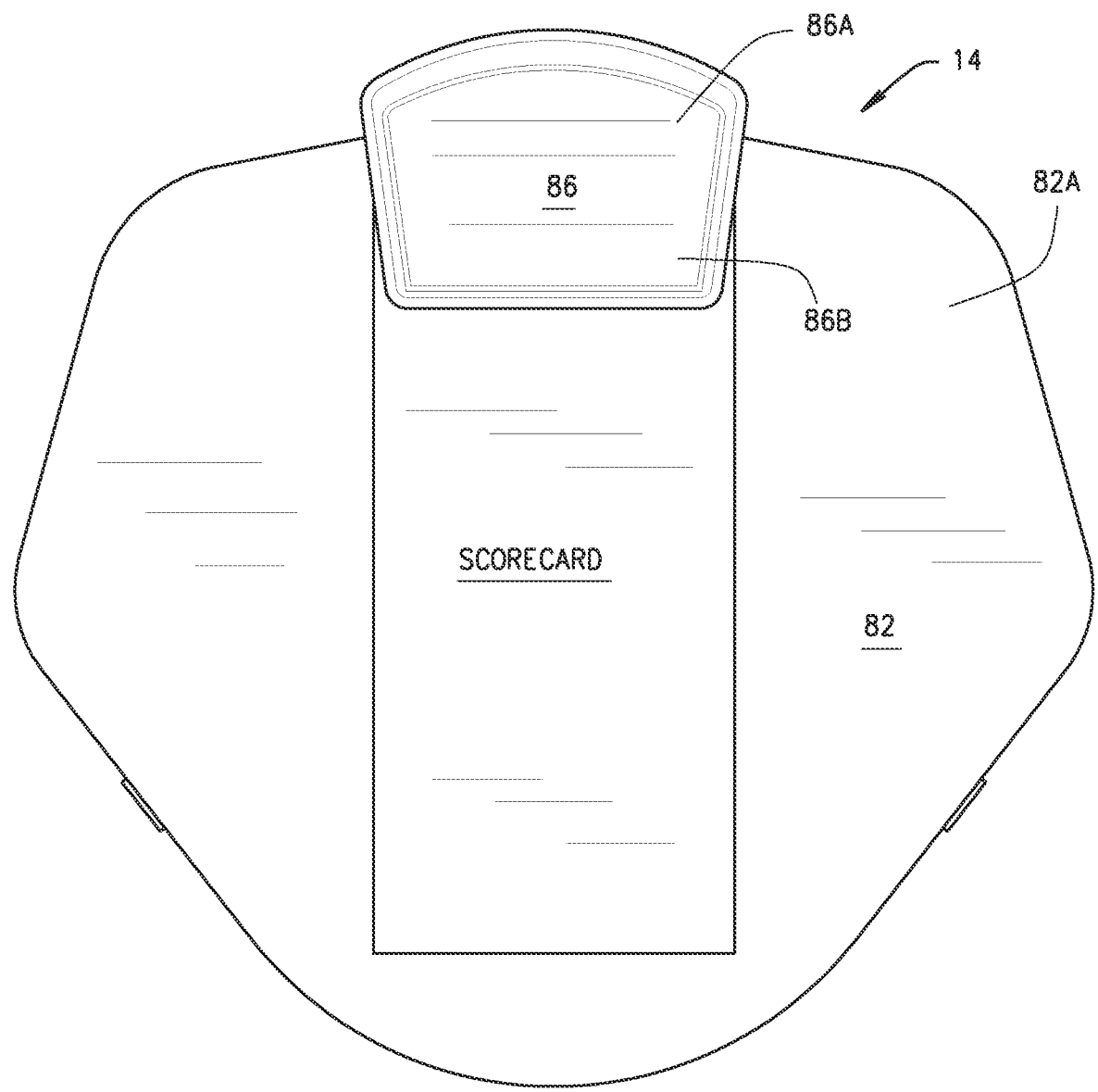
FIG. 2 is an exemplary top view of the scorecard holder assembly shown in FIG. 1, in accordance with various embodiments of the present disclosure.
Figure 3:
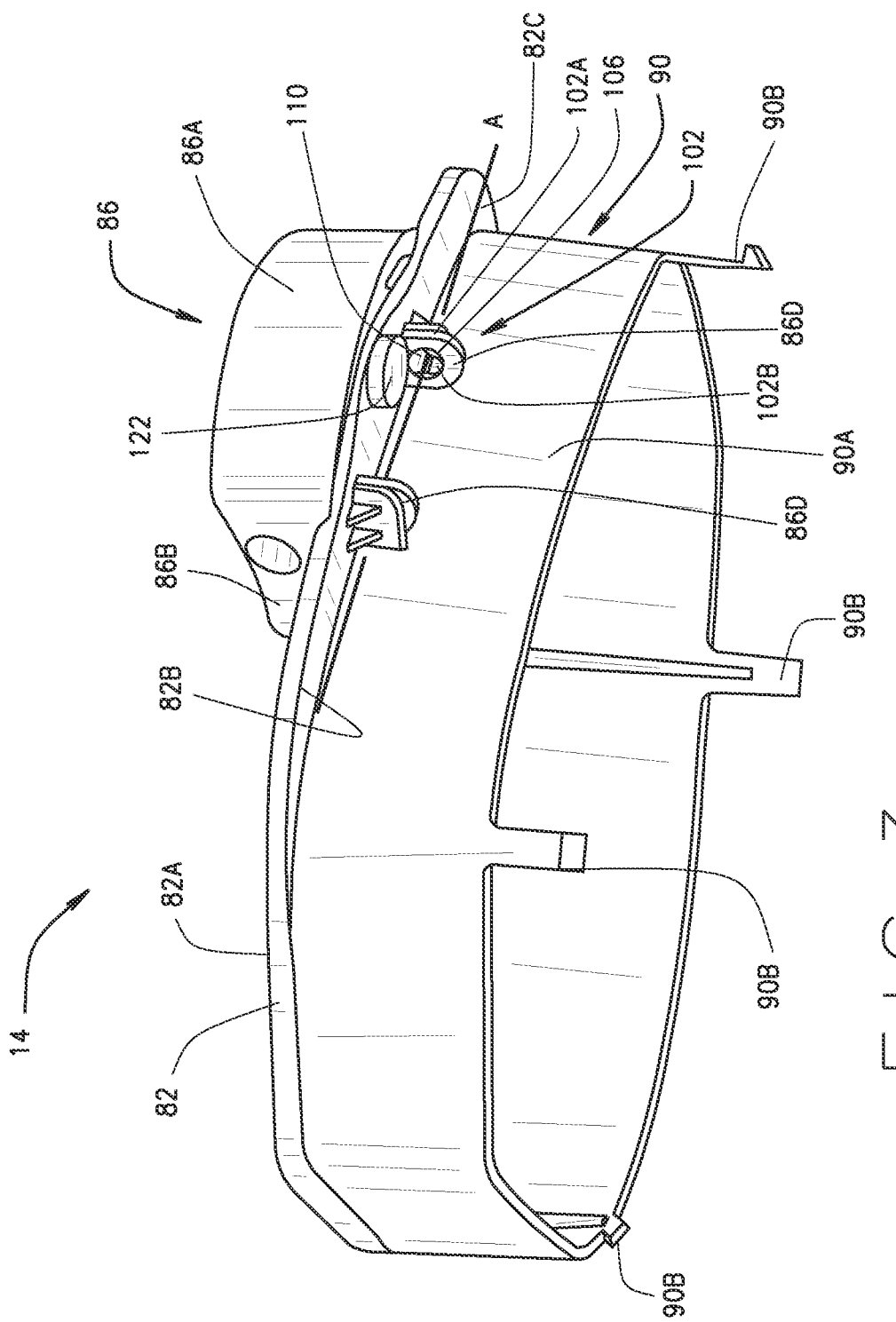
FIG. 3 is an exemplary isometric view of the scorecard holder assembly shown in FIGS. 1 and 2, in accordance with various embodiments of the present disclosure.
Figure 4:
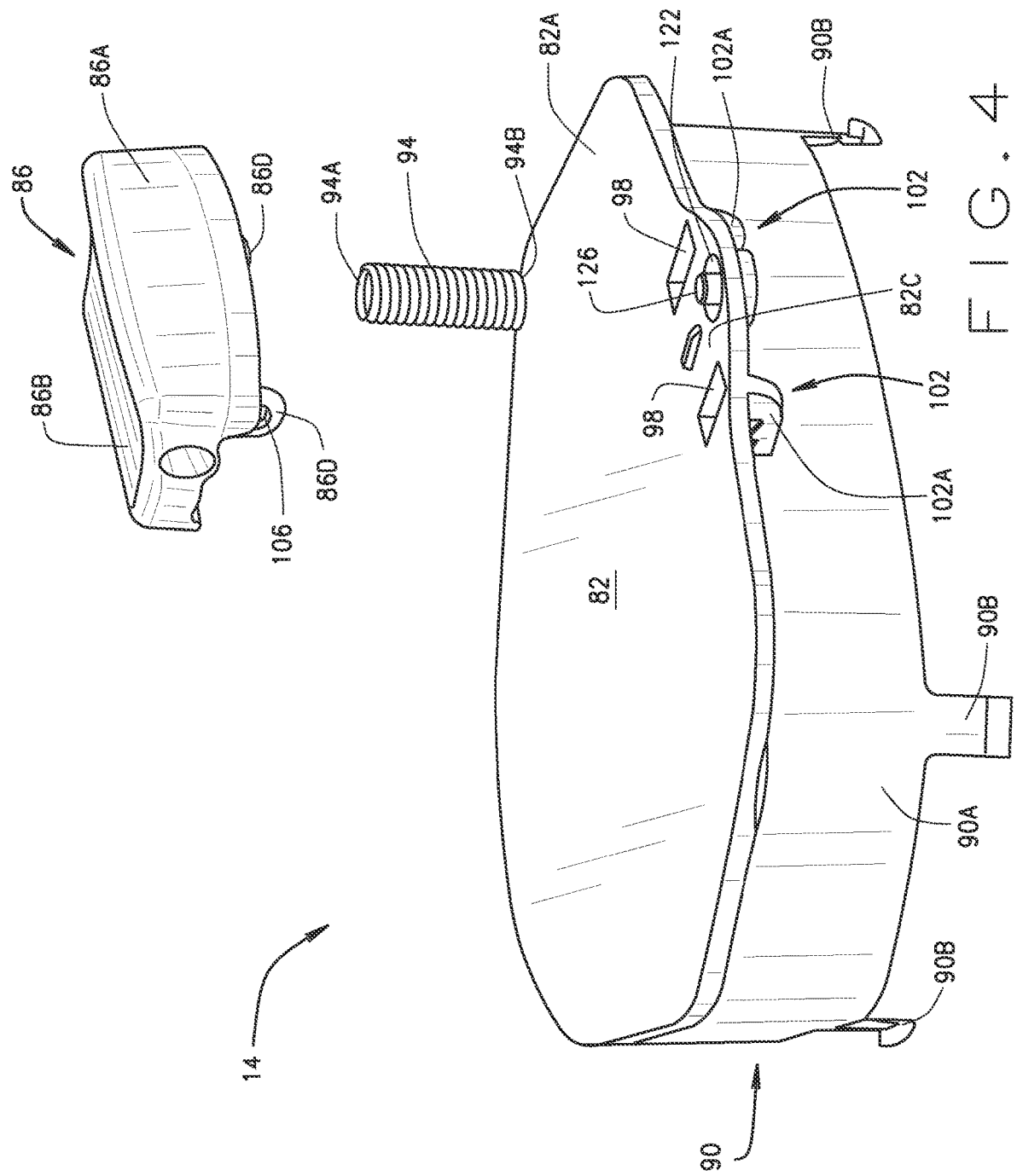
FIG. 4 is an exemplary isometric exploded top view of the scorecard holder assembly shown in FIGS. 1 through 3, in accordance with various embodiments of the present disclosure.
Figure 5:
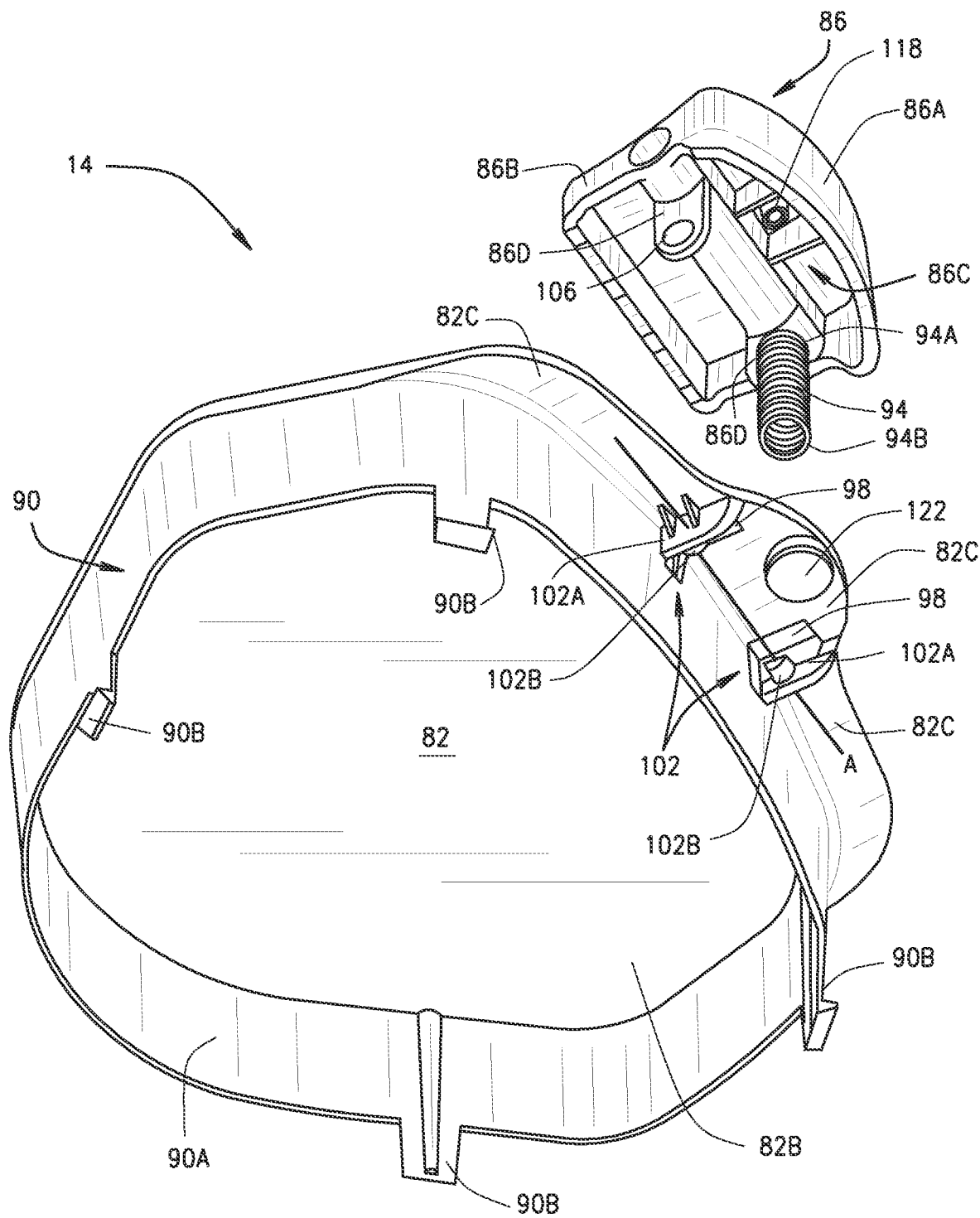
FIG. 5 is an exemplary isometric exploded bottom view of the scorecard holder assembly shown in FIGS. 1 through 3, in accordance with various embodiments of the present disclosure.

Referring now to FIGS. 1, 2 and 3, in various embodiments, the present disclosure generally provides a golf car 10 comprising a scorecard holder assembly 14 that is mounted to or integrally formed with a steering wheel 18 of the golf car 10. The scorecard holder assembly 14 is structured and operable to securely, but removably, retain a scorecard or any other similar document, device or object. However, for simplicity the scorecard holder assembly 14 will be described herein as structured and operable to securely, but removably, retain a scorecard. More specifically, as described below, the scorecard holder assembly 14 will be described herein as structured and operable hold or retain a scorecard with a greater clamping force than known scorecard holders and also to allow for easy opening of the retention clip for placement and removal of the scorecard using less force on a retention clip 86 of the assembly 14 than known scorecard holders.

The golf car 10 generally includes a chassis or frame 26, a pair of rear wheels 30 and a pair of front wheels 34 operationally connected to the chassis 26, and a passenger compartment 38. The passenger compartment 38 generally includes an instrument panel or dash console 42, a floorboard 46, and a passenger seating structure 50. The instrument panel/dash console 42 can include one or more instrument displays, gauges, vehicle control devices and/or storage compartments. The passenger compartment 38 additionally includes the steering wheel 18 for use by the passenger/user to control the directional movement of the golf car 10, a brake pedal 58 for use by the passenger/user to control slowing and stopping of the golf car 10, and an accelerator pedal 62 for use by the operator to control the torque delivered by a prime mover (not shown) to one or more of the rear and/or front wheels 30 and/or 34. Particularly, the prime mover is operatively connected to a drivetrain (not shown) that is operatively connected between the prime mover and at least one of the rear and/or front wheels 30 and/or 34.

The golf car 10 further comprises a vehicle electrical power source such as one or more battery (not shown) that is structured and operable to provide electrical power to various electrical components of the golf car 10 (e.g., an electric motor prime mover, and other vehicle electrically operated modules and components), The prime mover can be any device that is structured and operable to generate torque (e.g., motive force, e.g., power) utilized to provide motive force for the golf car 10 via the drivetrain. For example, in various embodiments, the prime mover can be an internal combustion engine (ICE), an electric motor, a hybrid combination of an ICE and an electric motor, or any other suitable motive power source. The golf car 10 further includes a front body portion 66 and a rear body portion 70. The rear body portion 70 is formed to comprise a rear deck 74 and a golf bag well 78. The golf bag well 78 is structured and operable to have golf bags disposed therein and to retain the bottom portions of the golf bags.

The scorecard holder assembly 14 generally includes a baseplate 82 and a retention clip 86 pivotally connectable to the baseplate 82. The baseplate 82 includes a topside face 82A, an underside face 82B and a clip attachment portion 82C defined and provided along a peripheral edge portion of the baseplate 82. As described in detail below, the retention clip 86 is pivotally connectable to the clip attachment portion 82C of the baseplate 82 such that a pivot axis A of the retention clip 86 relative to the baseplate 82 is disposed below (relative to the orientation of the scorecard holder assembly 14 when installed within the steering wheel 18) and adjacent the underside face 82B of the baseplate 82. In various embodiments, the scorecard holder assembly can additionally include a steering wheel mounting structure 90 connected to or integrally form with and extending from the baseplate underside face 82B. The steering wheel mounting structure 90 can be any structure suitable for mounting and securing the scorecard holder assembly 14 to the steering wheel 18. For example, as exemplarily illustrated in FIG. 3, in various embodiments, the steering wheel mounting structure can comprise an alignment wall 90A that is structured and operable to align the scorecard holder assembly 14 within a recess or aperture (not shown) within the steering wheel 18, and a plurality of snap clip retention feet 90B structured and operable to retain the alignment wall 90A within the recess or aperture within the steering wheel 18 and thereby mount the scorecard holder assembly 14 to the steering wheel 18.

Referring now to FIGS. 1 through 8, the retention clip 86 comprises a head section 86A and a foot section 86B and a pair of connecting arms 86D extending from the backside 86C of the retention clip 86. The scorecard holder assembly 14 additionally comprises a biasing device 94 disposed between a backside 86C of the retention clip 86 and the topside face 82A of the baseplate 82. The biasing device 94 is structured and operable to exert a closing force in the $Y^+$ direction on the backside 86C of the head portion 86A of the retention clip 86 to bias the clip to a Closed position, as illustrated in FIG. 8. The biasing device 94 can be any device structured and operable to apply a specific force in the $Y^+$ direction on the backside 86C of the retention clip head portion 86A to bias the clip 86 to the Closed position wherein the retention clip foot portion 86B is pressed firmly against the baseplate topside face 82A with a specific amount force, referred to herein as the closing force. For example, as exemplarily illustrated in 4, 5, 6, 7 and 8, the biasing device 94 can be a compression spring structured and operable to exert a specific force in the $Y^+$ direction on the backside 86C of the retention clip head portion 86A to bias the clip 86 to the Closed position such that the retention clip foot portion 86B is pressed against the baseplate topside face 82A with specific closing force.

In various embodiments, the baseplate 82 comprises a pair of clip connecting arm receiving orifices 98 formed in the clip attachment portion 82C of the baseplate 82, and a clip mounting structure 102 formed with and extending from the baseplate underside face 82B of the baseplate clip attachment portion 82C. The clip mounting structure 102 comprises a pair of opposing shoulders 102A extending from the baseplate underside face 82B of the baseplate clip attachment portion 82C, and a pair of opposing mounting bosses 102B extending from the shoulders 102A (i.e., each mounting boss 102B extends from a respective one of the shoulders 102A). As illustrated in the various figures, the mounting bosses 102B define the pivot axis A disposed below and adjacent the underside face 82B of the baseplate 82. As described above, the pivot axis A is the axis about which the retention clip 86 pivots during operation.

As described above, the retention clip 86 comprises the pair of connecting arms 86D that extend from the backside 86C of the retention clip 86. The connecting arms 86D have a length L extending from the backside 86C of the retention clip 86 to a distal end thereof (see FIGS. 7 and 8) and are structured to be flexible but have a resilient stiffness that will connect and retain the retention clip 86 to the clip mounting structure 102, as described below. Moreover, each connecting arm 86D comprises a receiving aperture 106 formed in a distal end of the respective connecting arm 86D. The receiving apertures 106 are structured and operable to receive and retain a respective one of the clip mounting structure mounting bosses 102B such that the retention clip 86 is pivotally connected to the clip attachment portion 102 of the baseplate 82 and pivotal about the pivot axis A located and disposed beneath and adjacent the underside face 82B of the baseplate 82. More specifically, as exemplarily illustrated in the various figures, when the scorecard holder assembly 14 is assembled, the connecting arms 86D of the retention clip 86 extend through the connecting arm orifices 98 formed in the baseplate clip attachment portion 82C and the receiving apertures 106 are disposed over and around the mounting bosses 102B such that the retention clip 86 is pivotally mounted to and retained on clip mounting structure 102 via the mounting bosses 102B and the stiffness and resilience of the retention clip connecting arms 86D. That is, to pivotally mount the retention clip 86 on the clip mounting structure 102, the connecting arms 86D are inserted through the connecting arm orifices 98, whereafter the connecting arms 86D are flexed inward toward each other such that connecting arms 86D extend past the mounting bosses 102 and the receiving apertures 106 align with the mounting bosses 102B. Thereafter, the stiffness and flexible resilience of the connecting arms 86D returns the connecting arms 86D to their static disposition whereby the receiving apertures 106 are disposed over and around the mounting bosses 102B such that the connecting arms 86D are retained on the mounting bosses 102B. Accordingly, once the connecting arms 86D are retained on the mounting bosses 102B the retention clip 86 is pivotally mounted on, or connected to, the clip mounting structure 102, whereby the retention clip 86 pivotable between the Closed and Open positions (and vice-versa) about the pivot axis A disposed below and adjacent the underside face 82B of the baseplate 82.

As described herein known scorecard clips are typically connected through two posts that extend from the scorecard clip, wherein the posts attach to the plate through two holes and are held into place with two screws. On the posts, there are two springs (also held by the screws) that give the clip the clamp load. It should be noted that the scorecard holder assembly 14 of the present disclosure does not utilize any mechanical fasteners, such as screws, nuts, bolts, rivets, etc., to attach and retain the retention clip 86 to the clip mounting structure 102 of the baseplate 82 that are separate and independent from, and not integrally formed with, the retention clip 86 nor the clip mounting structure 102 of the baseplate 82.

Figure 6:
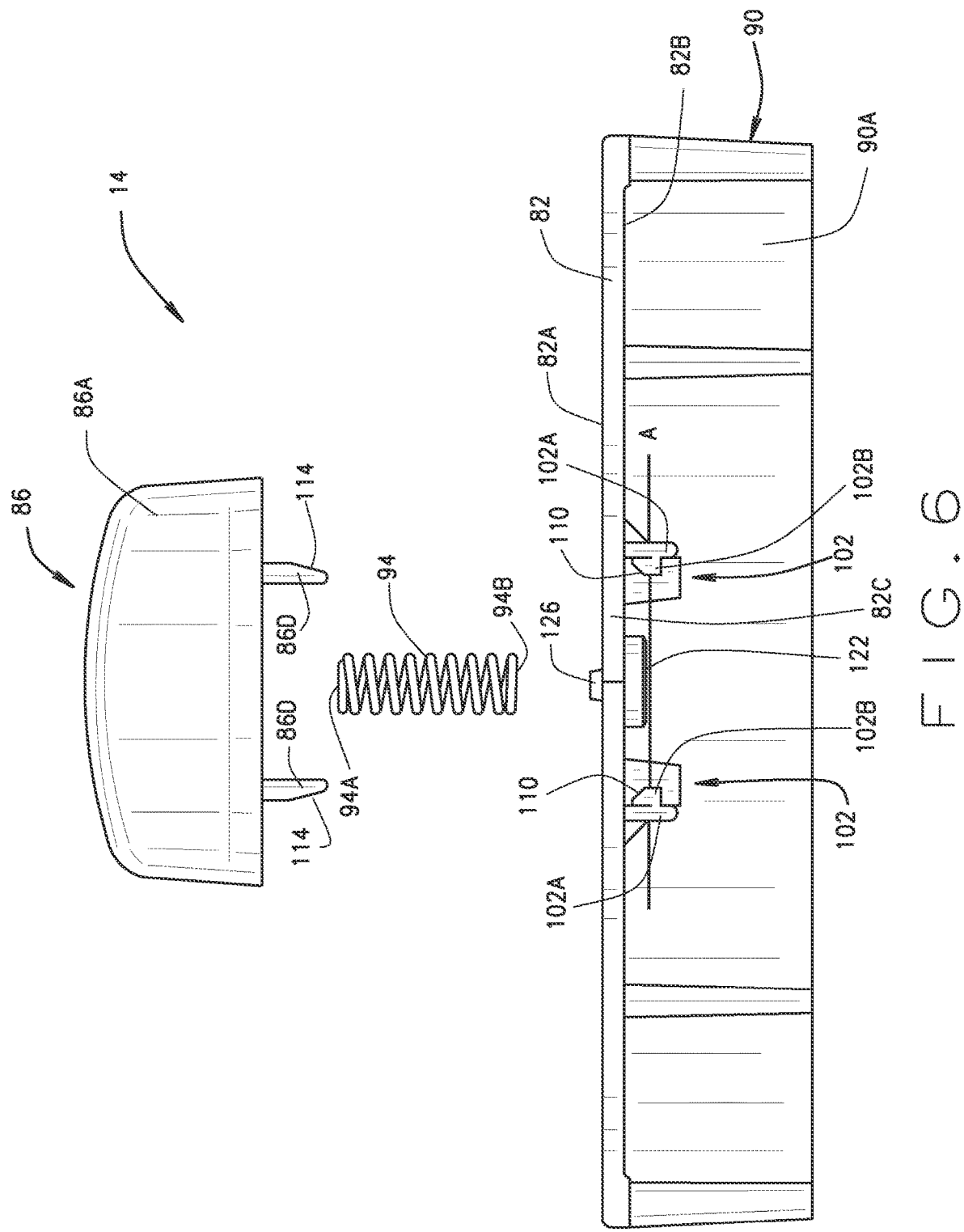
FIG. 6 is an exemplary isometric exploded rear view of the scorecard holder assembly shown in FIGS. 1 through 7, in accordance with various embodiments of the present disclosure.
Figure 7:
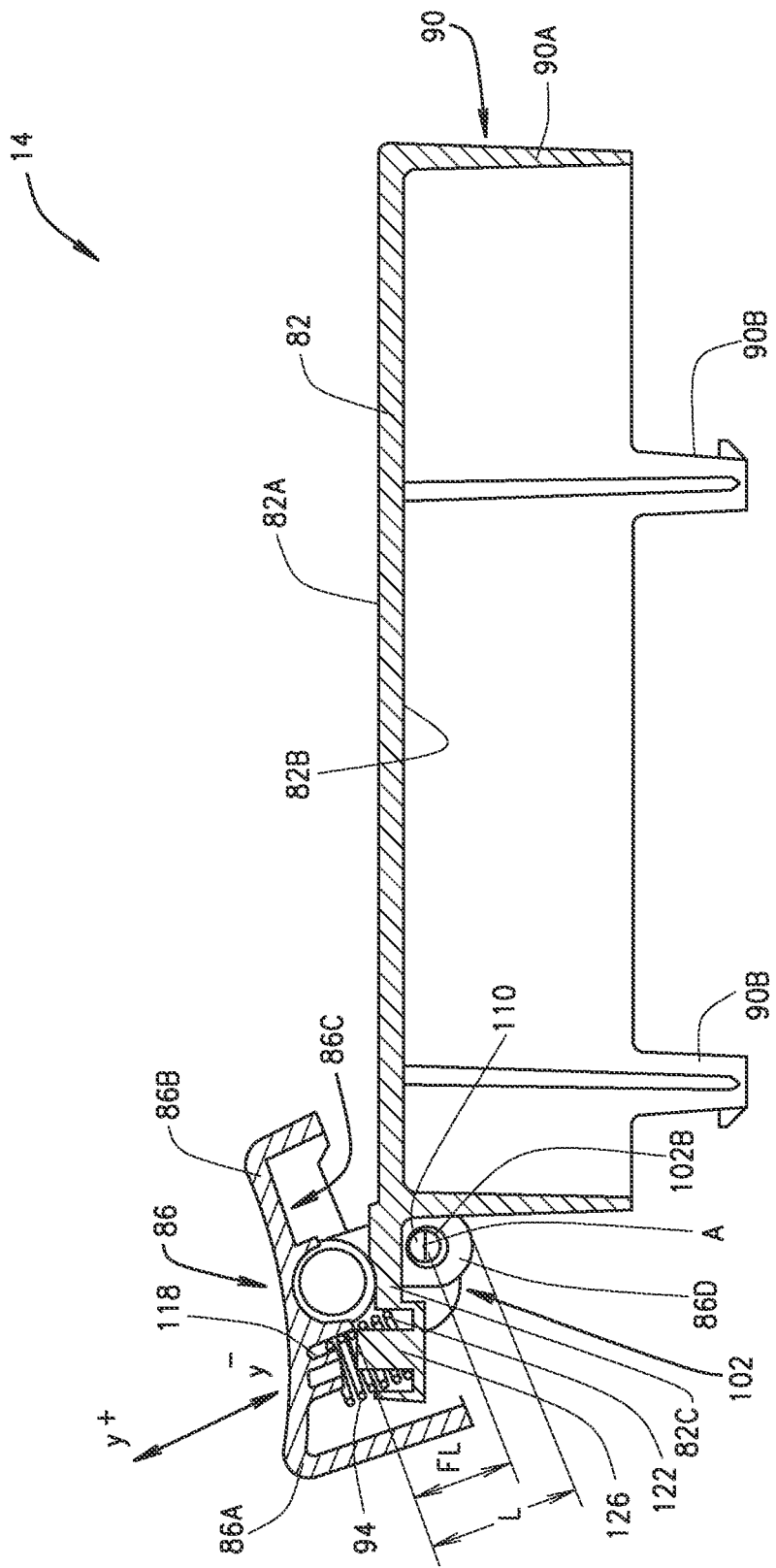
FIG. 7 is an exemplary cross-sectional side view of the scorecard holder assembly shown in FIGS. 1 through 6, wherein a retention clip of the scorecard holder assembly is shown in an Opened position, in accordance with various embodiments of the present disclosure.

As most clearly illustrated in FIG. 6, in various embodiments, the mounting bosses comprise a beveled, chamfered or angled face 110 that is structured and operable to guide distal ends of the connecting arms 86D over and past distal ends of the mounting bosses 102B. The beveled, chamfered or angled faces 110 are formed on mounting bosses 102B such that the mounting faces 110 are facing upward toward the underside 82B of the baseplate 82, and more particularly toward the clip connecting arm orifices 98. The beveled, chamfered or angled faces 110 are structured to force (i.e., flex) the distal ends of connecting arms 86D inward toward each other as the connecting arms 86D are inserted through the clip connecting orifices 98. The connecting arms 86D will then slide along the beveled, chamfered or angled faces 110 and extend past the mounting bosses 102. Thereafter, the receiving apertures 106 will align with the mounting bosses 102B. and the stiffness and flexible resilience of the connecting arms 86D will force the receiving apertures 106 over and around the mounting bosses 102B, thereby snap fitting the retention clip 86 onto the clip mounting structure 102, as described above. Additionally, in various embodiments, the distal ends of the connecting arms 86C comprise a beveled, chamfered or angled outer face 114 that face away from each other and toward the shoulders 102A of the clip mounting structure 102 when inserted through the clip connecting arm orifices 98. The connecting arm beveled, chamfered or angled faces 114 are structured and operable to interact and interface with the mounting boss beveled, chamfered or angled faces 110. That is, as the connecting arms 86D are inserted through the clip connecting orifices 98 the connecting arms beveled, chamfered or angled faces 114 will contact, interact and interface with the mounting boss beveled, chamfered or angled faces 110 such that the distal ends of the connecting arms 86D will slide over the mounting bosses 102 and snap fit connect the retention clip 86 onto the clip mounting structure 102, as described above.

In various embodiments, wherein the biasing device 94 comprises a compression spring, the retention clip 86 further comprises a biasing device alignment post 118 extending from the backside 86C of the head section 86A of the retention clip 86. The alignment post 118 is structured and operable to align and retain a first distal end 94A of compression spring 94 when the compression spring 94 is disposed between a backside 86C of the retention clip head section 86A and the topside face 82A of the baseplate 82. Furthermore, in various embodiments, wherein the biasing device 94 comprises a compression spring, the baseplate 82 comprises a biasing device receiving reservoir 122 that is structured and operable to receive and retain a second distal end 94B of the compression spring 94 when the compression spring 94 is disposed between a backside 86C of the retention clip head section 86A and the topside face 82A of the baseplate 82. In various embodiments, the baseplate 82 can further comprise a biasing device receiving reservoir post 126 that is structured and operable to also receive and retain to second distal end 94B of the compression spring 94 when the compression spring 94 is disposed between a backside 86C of the retention clip head section 86A and the topside face 82A of the baseplate 82.

As described above, the connecting arms 86D have a length L, are connected to the clip mounting structure 102, via the mounting bosses 102B, below and adjacent the underside face 82B of the baseplate 82 such that the pivot axis A of the retention clip 86 is below and adjacent the underside face 82B of the baseplate 82. One skilled in the art would readily and easily understand that the length L of the connecting arms 86D provides a force lever FL that is applied during rotation of the retention clip 86 between the Closed and Opened positions and vice-versa. The force lever FL extends from the backside 86C of the retention clip 86 to the pivot axis A (i.e., the fulcrum of the force lever FL) below and adjacent the underside face 82B of the baseplate 82. As stated above, known scorecard assemblies have a retention clip pivot axis that is located above and adjacent the top surface of the respective baseplate. Accordingly, one skilled in the art would readily and easily understand the length of the force lever FL between the backside 86C of the retention clip 86 to the pivot axis A (located below and adjacent the underside face 82B of the baseplate 82) of the present disclosure is notably longer than a force lever extending between the backside of known retention clips to the pivot axis of known retention clips (located above and adjacent a top surface of the respective baseplate). Further, as one skilled in the art would readily and easily understand, the longer the force lever of the respective retention clip is, the easier the respective retention clip will move between Closed and Open position, i.e., less force will need to be applied to the respective retention clip head in the $Y^-$ direction to overcome the force applied by the biasing device in the $Y^+$ direction and move the respective retention clip between Closed and Open position. Additionally, as one skilled in the art would readily and easily understand, the longer the force lever of the respective retention clip is, the greater the force (i.e., a closing or clamping force) will be that is applied by the respective retention clip foot via the biasing device to the respective baseplate.

Hence, as one skilled in the art would readily and easily understand, the retention clip 86 of the present disclosure, having the longer force lever FL of the retention clip 86 compared to the shorter force lever of known retention clips, will require less force to be applied in the Y direction to the retention clip head 86A to overcome the force applied by the biasing device 94 in the $Y^+$ direction in order to move the retention clip 86 between Closed and Open position, than is required to move known retention clips between the Closed and Opened positions. In various embodiments, in addition to the affect of the force lever FL of the retention clip 86 on the ease of movement of the retention clip between the Opened and Closed position, the longer force lever FL of the retention clip 86 compared to the shorter force lever of known retention clips, will additionally generate a greater closing or clamping force applied by the retention clip foot 86B to the baseplate 82, via the biasing device 94, than is applied by known retention clips.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A golf car scorecard holder assembly, said assembly comprising:
   a baseplate comprising:
      a topside face u;
      an underside face;
      a clip attachment portion;
      a pair of clip arm receiving orifices formed in the clip attachment portion of the baseplate; and
      a clip mounting structure extending from an underside face of the clip attachment portion of the baseplate, wherein the clip mounting structure comprises:
         a pair of opposing shoulders extending from the underside face of the clip attachment portion of the baseplate; and
         a pair of opposing mounting bosses, each mounting boss extending from a respective shoulder, wherein the mounting bosses define a pivot axis extending through a center of each mounting boss;
   a retention clip pivotally connectable to the mounting bosses such that the retention clip is pivotal about the pivot axis; and
   a biasing device disposed between a backside of the retention clip and the topside face of the baseplate, the biasing device structured and operable to exert a closing force on the retention clip to bias the retention clip to a closed position.

2. The assembly of claim 1, wherein the retention clip comprises:
   the head section;
   a foot section;
   and a pair of connecting arms extending from the backside of the retention clip and through the clip arm receiving orifices, each connecting arm having a receiving aperture formed in a distal end thereof that is structured and operable to receive and retain a respective one of the mounting bosses of the clip mounting structure such that the retention clip is pivotally connectable to the clip attachment portion of the baseplate and pivotal about the pivot axis.

3. The assembly of claim 2, wherein the mounting bosses comprise a mounting boss beveled face, the mounting boss beveled faces structured and operable to guide the distal ends of the connecting arms past the mounting bosses such that the receiving apertures will be forced around the mounting bosses due to a flexibility and resiliency of the connecting arms, thereby snap fitting the retention clip to the clip mounting structure.

4. The assembly of claim 3, wherein the connecting arms comprise a connecting arm beveled faces structured and operable to interface with the mounting boss beveled faces such that the receiving apertures will be forced around the mounting bosses due to a flexibility and resiliency of the connecting arms, thereby snap fitting the retention clip to the clip mounting structure.

5. The assembly of claim 3, wherein the retention clip further comprises a biasing device alignment post extending from a backside of the head section of the retention clip, the alignment post structured and operable to align and retain a first distal end of a compression spring.

6. The assembly of claim 3, wherein the baseplate further comprises a biasing device receiving reservoir structured and operable to receive and retain a second distal end of a compression spring.

7. A golf car scorecard holder assembly, said assembly comprising:
   a baseplate having a topside face, an underside face and a clip attachment portion;
   a retention clip pivotally connectable to the clip attachment portion of the baseplate without mechanical fasteners; and
   a biasing device disposed between a backside of the retention clip and the topside face of the baseplate, the biasing device structured and operable to exert a closing force on the retention clip to bias the retention clip to a closed position.

8. A golf car, said golf car having a steering wheel comprising:
   a scorecard holder assembly, wherein the assembly comprises:
      a baseplate comprising:
         a topside face;
         an underside face;
         a clip attachment portion;
         a pair of clip arm receiving orifices formed in the clip attachment portion of the baseplate; and
         a clip mounting structure extending from an underside face of the clip attachment portion of the baseplate, wherein the clip mounting structure comprises:
            a pair of opposing shoulders extending from the underside face of the clip attachment portion of the baseplate; and
            a pair of opposing mounting bosses, each mounting boss extending from a respective shoulder, wherein the mounting bosses define a pivot axis extending through a center of each mounting boss;
      a retention clip pivotally connectable to the mounting bosses such that the retention clip is pivotal about the pivot axis; and
      a biasing device disposed between a backside of the retention clip and the topside face of the baseplate, the biasing device structured and operable to exert a closing force on the retention clip to bias the retention clip to a closed position.

9. The golf car steering wheel of claim 8, wherein the retention clip comprises:
   the head section;
   a foot section;
   and a pair of connecting arms extending from the backside of the retention clip and through the clip arm receiving orifices, each connecting arm having a receiving aperture formed in a distal end thereof that is structured and operable to receive and retain a respective one of the mounting bosses of the clip mounting structure such that the retention clip is pivotally connectable to the clip attachment portion of the baseplate and pivotal about the pivot axis.

10. The golf car steering wheel of claim 9, wherein the mounting bosses comprise a mounting boss beveled face, the mounting boss beveled faces structured and operable to guide the distal ends of the connecting arms past the mounting bosses such that the receiving apertures will be forced around the mounting bosses due to a flexibility and resiliency of the connecting arms, thereby snap fitting the retention clip to the clip mounting structure.

11. The golf car steering wheel of claim 10, wherein the connecting arms comprise a connecting arm beveled faces structured and operable to interface with the mounting boss beveled faces such that the receiving apertures will be forced around the mounting bosses due to a flexibility and resiliency of the connecting arms, thereby snap fitting the retention clip to the clip mounting structure.

12. The golf car steering wheel of claim 10, wherein the retention clip further comprises a biasing device alignment post extending from the backside of the head section of the retention clip, the alignment post structured and operable to align and retain a first distal end of a compression spring.

13. The golf car steering wheel of claim 10, wherein the baseplate further comprises a biasing device receiving reservoir structured and operable receive and retain a second distal end of a compression spring.

14. A golf car said golf car comprising:
a steering wheel, wherein the steering wheel comprises;
a scorecard holder assembly, wherein the assembly comprises:
 a baseplate comprising:
  a topside face;
  an underside face;
  a clip attachment portion;
  a pair of clip arm receiving orifices formed in the clip attachment portion of the baseplate; and
 a clip mounting structure extending from an underside face of the clip attachment portion of the baseplate, wherein the clip mounting structure comprises:
  a pair of opposing shoulders extending from the underside face of the clip attachment portion of the baseplate; and
  a pair of opposing mounting bosses, each mounting boss extending from a respective shoulder, wherein the mounting bosses define a pivot axis extending through a center of each mounting boss;
 a retention clip pivotally connectable to the mounting bosses such that the retention clip is pivotal about the pivot axis; and
 a biasing device disposed between a backside of the retention clip and the topside face of the baseplate, the biasing device structured and operable to exert a closing force on the retention clip to bias the retention clip to a closed position.

15. The golf car of claim 14, wherein the retention clip further comprises a pair of connecting arms extending from the backside of the retention clip and through the clip arm receiving orifices, each connecting arm having a receiving aperture formed in a distal end thereof that is structured and operable to receive and retain a respective one of the mounting bosses of the clip mounting structure such that the retention clip is pivotally connectable to the clip attachment portion of the baseplate and pivotal.

16. The golf car of claim 15, wherein the mounting bosses comprise a mounting boss beveled face, the mounting boss beveled faces structured and operable to guide the distal ends of the connecting arms past the mounting bosses such that the receiving apertures will be forced around the mounting bosses due to a flexibility and resiliency of the connecting arms, thereby snap fitting the retention clip to the clip mounting structure.

* * * * *